Patented Apr. 25, 1939

2,155,590

UNITED STATES PATENT OFFICE 2,155,590

VULCANIZABLE PLASTICIZER

Benjamin S. Garvey, Akron, Ohio, assignor to The B. F. Goodrich Company, New York, N. Y., a corporation of New York No Drawing. Application May 2, 1936,
Serial No. 77,609

40 Claims. (Cl. 260—17)

This invention relates to the use of plastic materials and in particular to the formation of new types of vulcanizable or heat convertible compositions.

It is desirable that a plastic have one set of properties to facilitate processing and another, and in some ways, distinctly different, set of properties for use. Thus the material should be soft, plastic, soluble, and tacky so that such operations as mixing, building, and molding can be conveniently accomplished. On the other hand, the best use can usually be made of the finished article when it is non-plastic, non-tacky, and insoluble. The change in properties can be brought about by some sort of curing operation similar to the vulcanization process used for rubber.

Studies of the vulcanization of rubber have led to the view that vulcanization is due to the formation of some sort of cross bonds between the long, fiber molecules of crude rubber. These may be chemical bonds such as sulfur bridges formed between two olefine groups or they may be physical bonds formed by mechanical interlocking of the molecules. The present invention is an application of the idea of mechanical bonding of linear polymers into a vulcanized mass.

The invention consists of mixing a compound containing two polymerizable groups such as diallyl succinate with a solid material which it will plasticize such as polyvinyl acetate, and then polymerizing the mixture. A suitable proportion of these components is four parts of polyvinyl acetate and one part of diallyl succinate. Such a mixture is soft, plastic, and soluble in acetone. It can be milled and compounded on standard two roll mixing mills. After the addition of a polymerization catalyst such as benzoyl peroxide it can be cured in a heated mold to a product which is fairly hard and slightly flexible and elastic at room temperature, and which is soft, flexible, and elastic but not plastic at 250° F. It is nearly insoluble in acetone.

The vulcanized product probably consists of a mechanically interlocked mixture of the two polymers. The polyallyl succinate appears to consist of comparatively short polyallyl chains with many succinate bridges and side chains. This complex, three dimensional molecular network is entwined with the network of long, two dimensional, polyvinyl acetate molecules and by mechanical bonding vulcanizes the entire mass although there is four times as much polyvinyl acetate as polyallyl succinate. As evidence for the fact that the vulcanized product is a mixture of polymers rather than a mixed polymer two facts may be cited. The same type of product can be obtained by substituting cellulose acetate or sucrose octaacetate for polyvinyl acetate. There is no reason to suspect that diallyl succinate would form a mixed polymer with either of these compounds yet both give plastic mixtures which can be cured to non-thermoplastic products. Furthermore the low molecular weight sucrose octaacetate can be quantitatively extracted from the cured product by means of acetone.

Diallyl succinate is typical of a large class of compounds which may be used for the same purpose. These compounds are characterized by the fact that they contain the polymerizable group

and in addition at least one other polymerizable olefinic double bond separated therefrom by at least one intervening atom so that the double bonds do not form a conjugated system and can therefore be polymerized to insoluble, non-thermoplastic products. Typical compounds of this class are:—vinyl or allyl esters of polybasic acids such as succinic, adipic, phthalic, citric, or phosphoric acids; acrylic and substituted acrylic esters of polyhydric alcohols such as glycol, glycerine, diethylene glycol and trimethylene glycol; vinyl or allyl esters of acrylic or crotonic acids; polyethylene itaconate; the polyester made by reacting diallyl tartrate with a mixture of succinyl and adipyl chlorides; divinyl ether or the polyvinyl ethers of polyhydric alcohols or phenols such as ethylene glycol, diethylene glycol, and hydroquinone; divinyl aromatic compounds such as divinyl benzene, divinyl naphthalene, or divinyl diphenyl; and 2,4 dichlorpentadiene 1,4. The preferred materials are those which are high boiling liquids. These have the desired plasticizing effect on the uncured mixtures and are not lost by evaporation during the manufacturing operations. For convenience, I refer to liquids of this type as vulcanizable plasticizers.

The cure may be brought about by any known method of polymerization which is effective for the particular vulcanizable plasticizer in question, e. g., heat, actinic light, catalysts, etc., the precise conditions being subject to variation over a wide range dependent on the nature of the materials used and of the product being made.

Polyvinyl acetate is representative of many organic materials which can be used with vulcanizable plasticizers. They fall into two main classes which may be termed linear high polymers and resinous materials of comparatively low molecular weight. Among the linear high polymers are soluble derivatives of cellulose such as cellulose esters and cellulose ethers; and many synthetic polymers made by polymerizing compounds which contain the polymerizable group

and no other polymerizable group, such as polyvinyl actate, polyvinyl chloride, polystyrene, polyvinyl ethers, polyacrylic esters, and mixed polymers such as those of vinyl chloride and vinyl acetate or vinyl ethyl ether and acrylic acid amide. Among the resinous materials of low molecular weight are rosin, ester gum, shellac, certain chlorinated naphthalenes and diphenyls, and many bituminous substances such as asphalts, tars, and pitches. These two groups are differentiated by their relative molecular weights. They are alike in that they exist as stable, non-crystalline solids in contrast to those organic compounds which readily crystallize and do not form stable resins. These solids can be plasticized with compatible liquids to give plastic or even fluid products. The solids themselves as well as their mixtures with ordinary plasticizers are thermoplastic and are not heat convertible. For convenience I classify these two groups together as plasticizable solids.

The vulcanization of linear high polymers by means of vulcanizable plasticizers is an application of certain theories concerning the vulcanization of rubber and there is reason to believe that the inter molecular structure in the vulcanized mass resembles in some essential characteristics the inter molecular structure of vulcanized rubber. Vulcanized compositions containing the linear high polymers have certain practical advantages over those containing the resins of lower molecular weight. The solubility of the plasticizable solid can be more effectively suppressed, uncured products can be obtained with a wider range of workable properties, and cured products can be obtained with greater strength and greater elasticity. In the class of resins of lower molecular weight, on the other hand, are some very low cost raw materials whose utility has been considerably restricted by their thermoplasticity. By means of this invention they can readily be converted into products which lack both the brittleness and the objectionable thermoplasticity of the raw materials, and which are exceedingly valuable for uses in which complete insolubility in all organic solvents is not required.

Vulcanizable plasticizers can be mixed with plasticizable solids to give easily workable compositions which can be molded and cured to give products which are comparatively non-thermoplastic and far less soluble than the uncured material. The range of mechanical properties obtainable with these plasticizable solids can be materially extended because the use of a vulcanizable plasticizer makes possible the use of larger amounts of normal plasticizers such as dibutyl phthalate and tricresyl phosphate than is otherwise practical. These normal plasticizers are ordinarily incorporated with plasticizable solids to increase their flexibility and to decrease their brittleness, particularly at low temperatures. Accompanying this desirable improvement in properties is an undesirable increase in plasticity, especially at elevated temperatures. Thus there has been a limit to the amount of normal plasticizer which could be used. By the addition of a vulcanizable plasticizer which lowers the plasticity of the cured product, particularly at high temperatures, this limit is raised to a marked extent.

In general any vulcanizable plasticizer can be used with any plasticizable solid with which it is compatible. Mixtures of two or more of either components may be used. Modifying ingredients such as normal plasticizers, pigments, or solvents may be added. In some cases it is desirable to use with the vulcanizable plasticizer one or more monomeric compounds containing only one polymerizable group. For example a mixture of vinyl acetate and diallyl succinate can be used to plasticize cellulose acetate. In this case the cured product is a mixture of cellulose acetate and a mixed polymer of the type described in the copending application of Garvey and Alexander, Serial No. 77,608, filed May 2, 1936.

The effectiveness of the vulcanizable plasticizers with regard to solubility depends to a considerable extent on the molecular weight of the polymer, which may be measured by the viscosity of its solutions. Thus, four different polymers of vinyl acetate having viscosities relative to each other of 2.5, 7.0, 15.0, and 30.0 were mixed in the following recipe and cured in a mold for one hour at 250° F.

|   | Per cent |
|---|---|
| Polyvinyl acetate | 71.4 |
| Diallyl succinate | 23.8 |
| Benzoyl peroxide | 4.8 |

The products were fairly flexible and elastic at room temperature and at 250° F. were elastic rather than plastic. Samples were cut into small pieces and extracted in acetone for 48 hours. The original polyvinyl acetate and the uncured mixtures were all completely soluble. The acetone extracts on the cured samples as compared to the viscosity of the polyvinyl acetate were:—

| Viscosity of polyvinyl acetate | Acetone extract of cured mixture |
|---|---|
|  | Percent |
| 2.5 | 62 |
| 7.0 | 28 |
| 15.0 | 13 |
| 30.0 | 12 |

The ratio of vulcanizable plasticizer to plasticizable solid depends on the properties desired in both the cured and the uncured products, on the solid used, and on the vulcanizable plasticizer used. By a suitable blending of the main constituents and the modifying ingredients such as normal plasticizers and pigments the consistency of the uncured product can be varied from that of a hard solid to that of a rather mobile liquid. The softness and mobility of the uncured mixture increase with increasing amounts of vulcanizable plasticizer. Normal plasticizers have a similar effect. Pigments decrease the fluidity of the mixture. The higher polymers, as indicated by viscosity measurements, require more plasticizer than do the lower polymers to give products of equal softness or fluidity.

Where the uncured material is a solid it can be used as a molding plastic. Where it is liquid either at room temperature or at curing temperature it can be poured as a liquid and cured to a molded article. The solid material can be dissolved in a suitable solvent and used as a lacquer.

As first applied the resulting film is readily soluble and thermoplastic but by a baking operation it can be converted to a non-thermoplastic and less readily soluble film. Lacquers of this type combine the advantages usually obtained with lacquers with those obtained by the use of drying oils. The liquid compositions can be used in a manner similar to that used for natural drying oils to make paints or varnishes. The liquid film can be converted to a hard, comparatively insoluble film by polymerization of the vulcanizable plasticizer. Since the components can be obtained with different chemical characteristics including those of esters, ethers, hydrocarbons, and the like, the compositions of this invention can be used to give coating compositions having a wide range of chemical and physical characteristics. The compositions which are originally fluid because of a high temperature of application, because of the use of solvents, or because of the high proportions of vulcanizable plasticizers, can be used for coating materials, as impregnating materials for paper and fabrics, for the lamination of glass, and similar uses.

By way of illustration I give the following examples:

*Example No. 1.*—A mixture is made of 80 parts of polyvinyl acetate, 20 parts of diallyl succinate, and 5 parts of benzoyl peroxide. It is readily soluble and very thermoplastic and can be easily processed. When cured in a mold in a press for one hour at 250° F. it gives a product which is no longer thermoplastic and which is comparatively insoluble. Similar results can be obtained with mixtures of polyvinyl ethyl ether and the divinyl ether of ethylene glycol, or of polystyrene and divinyl benzene.

*Example No. 2.*—The mixture given in Example No. 1 can be dissolved in 500 to 1000 parts of acetone to give a smooth solution. When this solution is painted on an iron panel it dries out quickly to a solid film. This film can be easily dissolved again in acetone. When the film is heated for about an hour at 250° F. it is no longer readily soluble in acetone.

*Example No. 3.*—A mixture of 50 parts of cellulose acetate, 50 parts of triallyl citrate, and 5 parts of benzoyl peroxide gives a flexible, thermoplastic, and easily processed material. When cured in a press for one hour at 250° F. it is converted to a non-thermoplastic product.

*Example No. 4.*—A mixture of 75 parts of diallyl maleate, 25 parts of polyvinyl acetate, and 5 parts of benzoyl peroxide is a viscous liquid. It can be painted on an iron panel and when heated for about an hour at 250° F. it is converted to a hard insoluble film.

*Example No. 5.*—A mixture of 75 parts of shellac, 25 parts of diallyl tartrate, and 5 parts of benzoyl peroxide gives an uncured product which is a solid resin at room temperature and a viscous liquid at 250° F. When heated for one hour at 250° F. it is converted to a non-thermoplastic solid which is hard at room temperature.

A similar product can be made with asphalt and divinyl benzene.

*Example No. 6.*—The mixture of the preceding example can be dissolved in 200 to 400 parts of methanol. When this solution is painted on an iron panel it quickly dries to a non-tacky film which can be rendered non-thermoplastic by heating for one hour at 250° F.

*Example No. 7.*—A mixture of 75 parts of resinous, chlorinated diphenyl, known commercially as Arochlor 4465, 25 parts of diallyl maleate, and 5 parts of benzoyl peroxide is resinous at room temperature and liquid at 250° F. If heated for one hour at 250° F. it is converted to a comparatively non-thermoplastic resin.

*Example No. 8.*—A mixture of 75 parts of diallyl maleate, 25 parts of ester gum, and 10 parts of benzoyl peroxide is a viscous liquid at room temperature. If the mixture is painted on an iron panel and heated for one hour at 250° F. the liquid film is converted to a hard, non-thermoplastic film.

It will be understood that the specific embodiments of the invention described above are given by way of illustration only. Any of the vulcanizable plasticizers can be used with any of the plasticizable solids with which they are compatible and various modifying ingredients can be added. Thus, a wide range of chemical characteristics and of physical properties of the cured and uncured products can be obtained. Variations within wide limits are possible without departing from the spirit and scope of the invention.

I claim:

1. A process which comprises mixing with a plasticizable solid a compound compatible therewith which contains the polymerizable group

and at least one other polymerizable olefinic double bond separated therefrom by at least one intervening atom so that the double bonds do not form a conjugated system, and vulcanizing the composition by polmerizing the second compound.

2. A process which comprises mixing with a linear high polymer a compound compatible therewith which contains the polymerizable group

and at least one other polymerizable olefinic double bond separated therefrom by at least one intervening atom so that the double bonds do not form a conjugated system, and vulcanizing the composition by polymerizing the second compound.

3. A process which comprises mixing with a polymer of a compound containing the polymerizable group

and no other polymerizable group a compound compatible therewith which contains the polymerizable group

and at least one other polymerizable olefinic double bond separated therefrom by at least one intervening atom so that the double bonds do not form a conjugated system, and vulcanizing the composition by polymerization of the second compound.

4. A process which comprises mixing a polymer of a vinyl ester of a monobasic acid with a compound compatible therewith which contains the polymerizable group

and at least one other polymerizable olefinic double bond separated therefrom by at least one intervening atom so that the double bonds do not form a conjugated system, to give a plastic, vulcanizable composition, and vulcanizing this composition.

5. A process which comprises mixing with a polymer of vinyl acetate an allyl ester of a polybasic acid to give a plastic, vulcanizable composition, and vulcanizing composition.

6. A process which comprises mixing a polymer of vinyl acetate with diallyl succinate to give a plastic, vulcanizable composition, and vulcanizing this composition by polymerization of the diallyl succinate.

7. A process which comprises mixing with a soluble derivative of cellulose a compound compatible therewith which contains the polymerizable group

and at least one other polymerizable olefinic double bond separated therefrom by at least one intervening atom so that the double bonds do not form a conjugated system, and vulcanizing this composition by polymerization of the second compound.

8. A process which comprises mixing with a cellulose ester a compound compatible therewith which contains the polymerizable group

and at least one other polymerizable olefinic double bond separated therefrom by at least one intervening atom so that the double bonds do not form a conjugated system to give a plastic, vulcanizable composition, and vulcanizing this composition.

9. A process which comprises mixing cellulose acetate with an allyl ester of a polybasic acid to give a plastic, vulcanizable composition, and vulcanizing this composition.

10. A process which comprises mixing cellulose acetate with triallyl citrate, and vulcanizing the composition by polymerization of the triallyl citrate.

11. A process which comprises spreading to a thin film a liquid mixture comprising a plasticizable solid and a compound containing the polymerizable group

and at least one other polymerizable olefinic double bond separated therefrom by at least one atom so that the double bonds do not form a conjugated system, and curing the film by polymerization of the second compound.

12. A process which comprises spreading to a thin film a liquid mixture comprising a linear high polymer and a compound containing the polymerizable group

and at least one other polymerizable olefinic double bond separated therefrom by at least one atom so that the double bonds do not form a conjugated system, and curing the film by polymerization of the second compound.

13. A process which comprises spreading to a thin film a liquid mixture comprising a polymerized vinyl ester of a monobasic acid and a compound containing the polymerizable group

and at least one other polymerizable olefinic double bond separated therefrom by at least one intervening atom so that the double bonds do not form a conjugated system, and curing the film by polymerization of the second compound.

14. A process which comprises spreading to a thin film a liquid mixture comprising a polymerized vinyl ester of a mono basic acid and an allyl ester of a polybasic acid, and curing the film by polymerization of the allyl ester.

15. A process which comprises spreading to a thin film a liquid mixture comprising polyvinyl acetate and diallyl maleate, and curing the film by polymerization of the diallyl maleate.

16. A vulcanizable composition comprising a mixture of a plasticizable solid and a compound compatible therewith which contains the polymerizable group

and at least one other polymerizable olefinic double bond separated therefrom by at least one atom so that the double bonds do not form a conjugated system, and a catalyst of polymerization.

17. A vulcanizable composition comprising a mixture of a linear high polymer and a compound compatible therewith which contains the polymerizable group

and at least one other polymerizable olefinic double bond separated therefrom by at least one intervening atom so that the double bonds do not form a conjugated system, and a catalyst of polymerization.

18. A vulcanizable composition comprising the polymer of a compound containing the polymerizable group

and no other polymerizable group, and a monomeric compound compatible therewith which contains the polymerizable group

and at least one other polymerizable olefinic double bond separated therefrom by at least one atom so that the double bonds do not form a conjugated system.

19. A vulcanizable composition comprising a polymerized vinyl ester of a monobasic acid and a compound compatible therewith which contains the polymerizable group

and at least one other polymerizable olefinic double bond separated therefrom by at least one atom so that the double bonds do not form a conjugated system.

20. A vulcanizable composition comprising a polymer of vinyl acetate and an allyl ester of a polybasic acid.

21. A vulcanizable composition comprising polyvinyl acetate and diallyl succinate.

22. A vulcanizable composition comprising a soluble derivative of cellulose and a compound compatible therewith which contains the polymerizable group

and at least one other polymerizable olefinic double bond separated therefrom by at least one atom so that the double bonds do not form a conjugated system, and a catalyst of polymerization.

23. A vulcanizable composition comprising a cellulose ester and a compound compatible therewith which contains the polymerizable group

and at least one other polymerizable olefinic double bond separated therefrom by at least one atom so that the double bonds do not form a conjugated system, and a catalyst of polymerization.

24. A vulcanizable composition comprising cellulose acetate and an allyl ester of a polybasic acid, and a catalyst of polymerization.

25. A vulcanizable composition comprising cellulose acetate and triallyl citrate, and a catalyst of polymerization.

26. A liquid composition comprising a plasticizable solid and a liquid solvent therefor including a compound containing the polymerizable group

and at least one other polymerizable olefinic double bond separated therefrom by at least one atom so that the double bonds do not form a conjugated system, and a catalyst of polymerization.

27. A liquid composition comprising a linear high polymer and a liquid solvent therefor including a compound containing the polymerizable group

and at least one other polymerizable olefinic double bond separated therefrom by at least one atom so that the double bonds do not form a conjugated system, and a catalyst of polymerization.

28. A liquid composition comprising a polymerized vinyl ester of a monobasic acid and a liquid solvent therefor including a compound containing the polymerizable group

and at least one other polymerizable group separated therefrom by at least one atom so that the double bonds do not form a conjugated system.

29. A liquid composition comprising a polymerized vinyl ester of a monobasic acid and a liquid solvent therefor including an allyl ester of a monobasic acid.

30. A liquid composition comprising polyvinyl acetate and a liquid solvent therefor including diallyl maleate.

31. A vulcanized composition comprising a polymer of a compound containing the polymerizable group

and at least one other polymerizable olefinic double bond separated therefrom by at least one atom so that the double bonds do not form a conjugated system, which compound has been polymerized in admixture with a plasticizable solid compatible with the unpolymerized compound but differing in composition from the final vulcanized product.

32. A vulcanized composition comprising a polymer of a compound containing the polymerizable group

and at least one other polymerizable olefinic double bond separated therefrom by at least one atom so that the double bonds do not form a conjugated system, which compound has been polymerized in admixture with a linear high polymer compatible with the unpolymerized compound.

33. A vulcanized composition comprising a polmer of a compound containing the polymerizable group

and at least one other polymerizable olefinic double bond separated therefrom by at least one atom so that the double bonds do not form a conjugated system, which compound has been polymerized in admixture with a soluble derivative of cellulose.

34. A vulcanized composition comprising a polymer of a compound containing the polymerizable group

and at least one other polymerizable olefinic double bond separated therefrom by at least one atom so that the double bonds do not form a conjugated system, which compound has been polymerized in admixture with a compatible polymer of a compound containing the group

and no other polymerizable group.

35. A vulcanized composition comprising a polymer of an ester which contains the polymerizable group

and at least one other polymerizable olefinic double bond separated therefrom by the ester group, which ester has been polymerized in admixture with a plasticizable solid compatible with the unpolymerized ester but differing in composition from the final vulcanized product.

36. A vulcanized composition comprising a polymer of a compound containing the polymerizable group

and at least one other polymerizable olefinic double bond separated therefrom by the ester group, which ester has been polymerized in admixture with a linear high polymer compatible with the unpolymerized ester.

37. A vulcanized composition comprising a polymer of a compound containing the polymerizable group

and at least one other polymerizable olefinic double bond separated therefrom by the ester group, which ester has been polymerized in admixture with a cellulose ester compatible with the unpolymerized ester.

38. A vulcanized composition comprising a polymer of an ester which contains the polymerizable group

and at least one other olefinic double bond separated therefrom by the ester group, which ester has been polymerized in admixture with a compatible polymer of a vinyl ester of a monobasic acid.

39. A vulcanized composition comprising a polymer of triallyl citrate which has been polymerized in admixture with cellulose acetate.

40. A vulcanized composition comprising a polymer of diallyl succinate which has been polymerized in admixture with polyvinyl acetate.

BENJAMIN S. GARVEY.